Jan. 19, 1926.
A. G. F. KUROWSKI
1,570,309
TYPEWRITING MACHINE
Filed Sept. 27, 1922    3 Sheets-Sheet 1
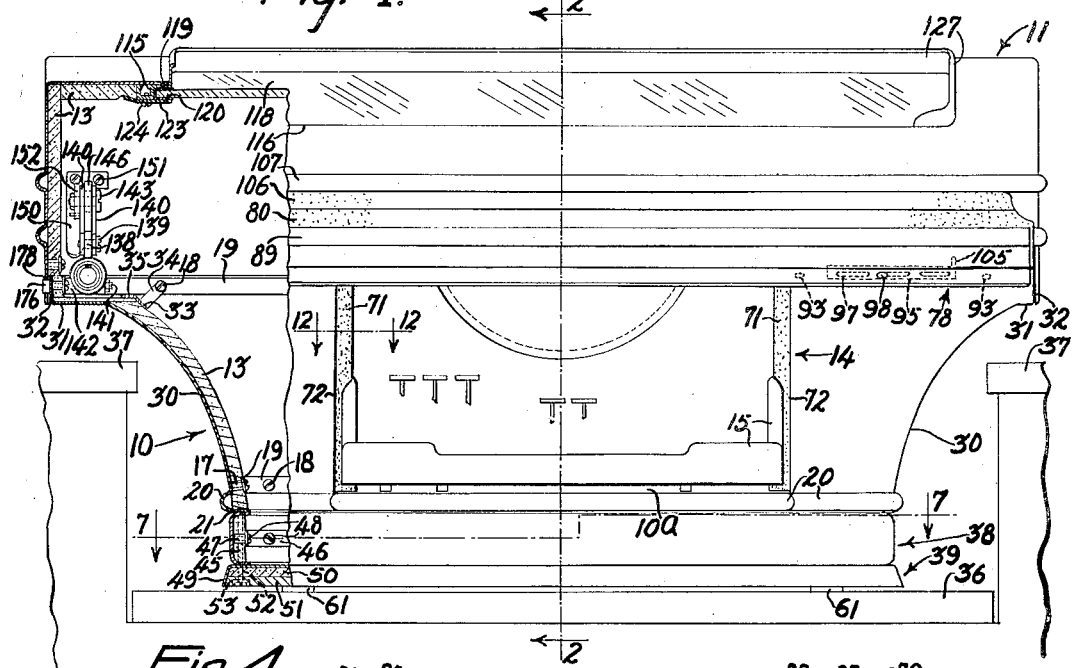
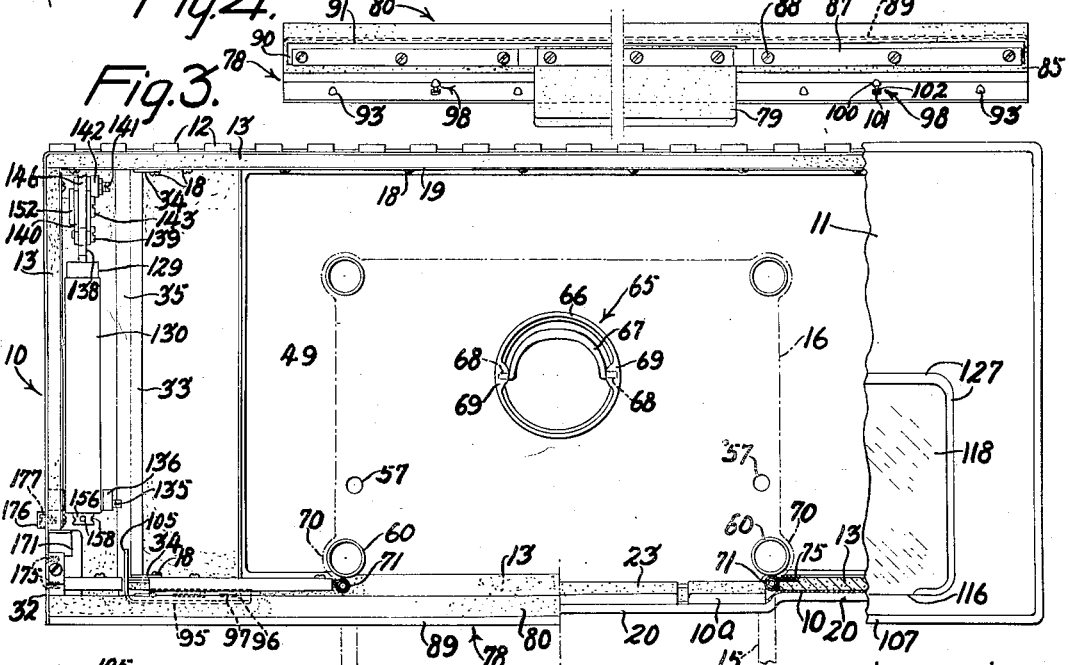
Inventor:
Alfred G. F. Kurowski
by R. C. Stickney
Attorney Jan. 19, 1926.
A. G. F. KUROWSKI
TYPEWRITING MACHINE
Filed Sept. 27, 1922    3 Sheets-Sheet 2
1,570,309
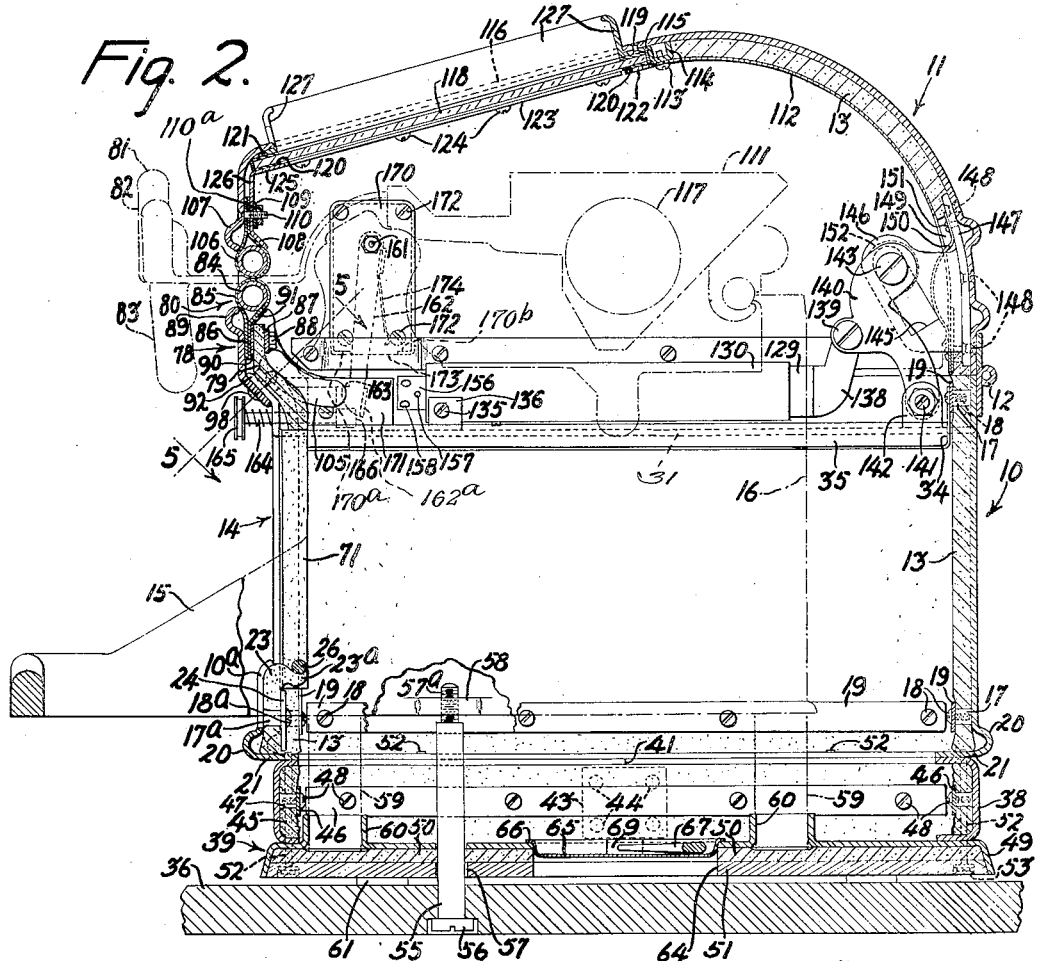
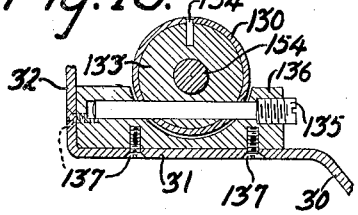
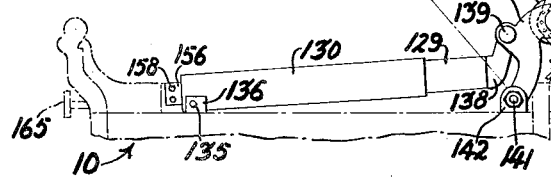
Inventor:
Alfred G F Kurowski
by B B Stickney
Attorney Jan. 19, 1926. 1,570,309
A. G. F. KUROWSKI
TYPEWRITING MACHINE
Filed Sept. 27, 1922      3 Sheets-Sheet 3
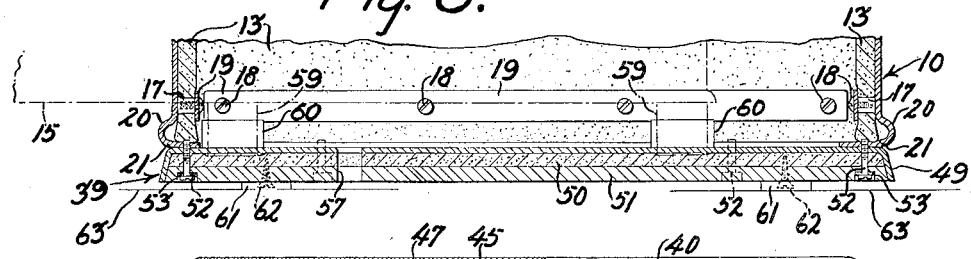
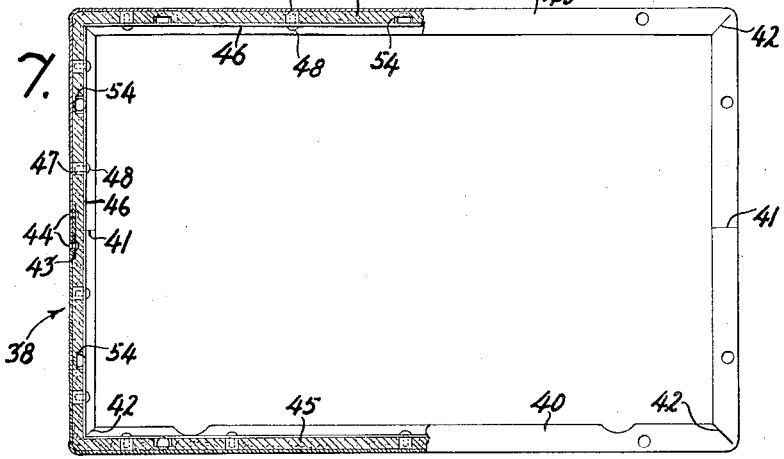
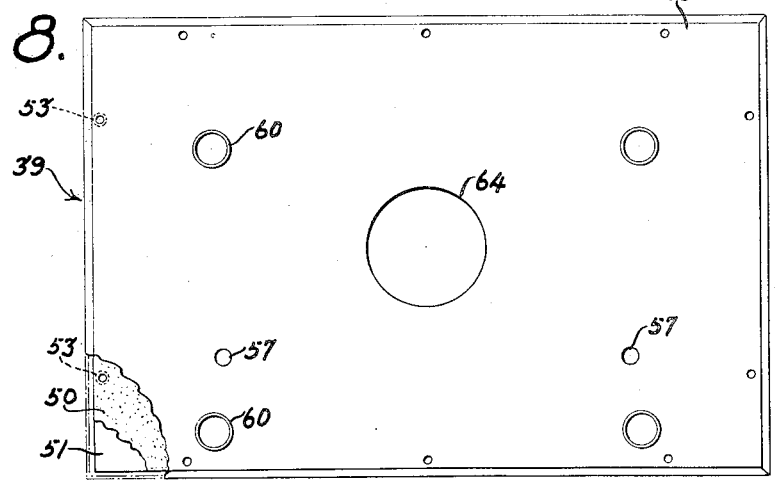
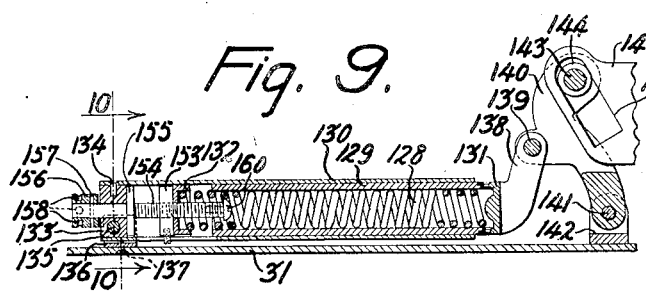
Inventor:
Alfred G. F. Kurowski
by B. C. Stickney
Attorney Patented Jan. 19, 1926.

1,570,309

UNITED STATES PATENT OFFICE.

ALFRED G. F. KUROWSKI, OF BROOKLYN, NEW YORK, ASSIGNOR TO UNDERWOOD TYPEWRITER COMPANY, OF NEW YORK, N. Y., A CORPORATION OF DELAWARE.

TYPEWRITING MACHINE.

Application filed September 27, 1922. Serial No. 590,756.

*To all whom it may concern:*

Be it known that I, ALFRED G. F. KUROWSKI, a citizen of the United States, residing in Brooklyn Borough, in the county of Kings, city and State of New York, have invented certain new and useful Improvements in Typewriting Machines, of which the following is a specification.

The present invention relates to sound-deadening casings for typewriting machines.

A casing of this character has an opening in the front thereof, through which the keyboard extension of the machine may project, for access by the operator to the keys thereof. The casing, at its base, is ordinarily of a width conformable to the width of the main frame of the machine; allowance being made for easy placement and removal of the machine; but, above the base, is flared or extended laterally outward to provide space in the upper part thereof, for movement of the typewriter-carriage in letter-feed and return directions; and the upper part of the casing is slotted horizontally and longitudinally thereof, for projection therethrough, and for movement therealong, of the operating levers on the typewriter-carriage.

The casing is usually made in two sections, to wit, a body-section, provided with a suitable base-piece, and a cover-section, hinged thereto; the cover being opened for placement and removal of the machine. The opening in the front wall of the casing for the keyboard extension may extend to the top of the casing-body; or may not extend to the top of the casing-body, in which latter event the machine may be inserted into the casing, in tilted position, and the keyboard extension passed forward through the opening in the front wall thereof. A window in the top of the casing has been provided for observation of the printing on the platen; and a spring-device for automatically opening the cover for erasures and adjustments has also been provided. The shell-sections of the casing have been provided with lining-sheets of sound-deadening material, such as felt; and the joints thereof, at the openings or slots, through which project the keyboard and the operating levers of the machine, have been equipped with cushions or edgings, which close the same against the emission of sound when the machine is in place; without, however, interfering with placement or removal of the machine, or with movement of the carriage and operating levers thereon.

The invention, as to certain features thereof, has special reference to casings made of sheet-metal, and to casings in which the opening for the keyboard extension of the machine extends to the top of the casing-body, to permit placement of the machine without insertion of the keyboard extension into the body thereof.

It is desirable that a casing of this character be adapted to be used on the baseboard or drop-leaf of a typewriter-desk. Ordinarily, however, this baseboard or drop-leaf is sunken or lies several inches below the top of the desk; and may not be of a width equal to the width of the flare or expanded upper portion of the casing. It may, therefore, happen that, on attempt to seat the casing on the baseboard, the expanded portion of the casing will be engaged by the walls of the desk at the sides of the baseboard, and seating of the casing and machine thus prevented.

An object of the present invention is the provision of a standard for use in connection with, and as part of, the casing, for elevating the casing-proper to a height to permit the same to clear the corners of a depression in the top of a desk when the casing-base-piece is set upon a platform in the depression. A feature of the invention is the provision of a bolster or standard, for the purpose mentioned, which may be set upon the casing-base-piece between the latter and the casing-proper, and which may be hollow, to permit the machine to be supported on the base-piece by means, such as replaceable feet, passing through the standard; so as to relieve the standard of the weight of the machine, and, consequently, to permit the same to be of light and cheap construction.

A feature of the invention is the provision of a base-piece for the casing, and for the support of the machine, which base-piece may be used with or without the bolster; and the provision of means for quickly and effectively anchoring the casing and the machine to the base-piece, whether or not the bolster be present, and for holding the casing proper down upon the bolster, and the latter in place upon the base-piece, when it is elected to use the bolster.

A feature of the invention is the provision of novel and efficient means for closing the joints at the sides of the machine between the keyboard extension and casing; and above the keyboard extension, between the front wall of the machine-frame and the casing; such means being torsionally resilient and flexible, so that there may be maintained a pressure of the upper portions thereof, rearward against the front of the machine, and of the lower portions thereof laterally against the keyboard extension of the machine, to close, throughout their lengths, the joints between the several parts of the machine and the casing; while permitting proper flexing thereof for insertion and removal of the machine.

An object of the invention is the provision of a cover-opening spring-device, which may be of any desired strength or force, while requiring but little space for its movements and housing. In this connection, a feature of the invention is the use, between the spring-opening device and the cover, of means for amplifying the motion of the spring-device, so that an ample cover-opening may be had with small movement of the spring-device, and so that, small movement of the spring-device being required, the same may be in the form of a relatively heavy coil-spring, conveniently housed by telescoping members.

A feature of the invention is the provision of a removable plate, adapted, when in place, to close the upper portion of the opening in the front wall of the casing over the keyboard extension, and to seat, in a novel and effective manner, the cushion which forms the lower wall of the slot, along which the operating levers on the carriage move; this removable plate, with the cushion and cushion-seat, and suitably equipped with sound-deadening material to close the joint between the casing and the front of the machine, being securely and quickly attachable, as a whole, to the casing front wall at the upper edge thereof.

A feature of the invention is the provision of a shade on the casing, to intercept light-rays which would otherwise be objectionably reflected from the window-pane to the eyes of the operator; such shade being securely fixable to the shell of the casing, and, in the preferred form thereof, being a strip or rail of sheet-material, projecting marginally upward from the edge of the window, and serving as a frame for the window-pane.

A feature of the invention is a casing, and the method of making the same, wherein the shells, forming the body-portion and the cover, are each of unitary, seamless structure, drawn into shape by suitable dies or presses, while in heated condition.

Other features and advantages will hereinafter appear.

In the accompanying drawings,

Figure 1 is a view, in front elevation, partly in cross-section, of the casing; the keyboard extension of a type-writing machine being shown protruding through the front wall of the casing; and a bolster or standard being shown between the casing proper and the base-piece to enable the lateral offsets or overhangs of the casing to clear the corners of a depression in the top of a desk when the machine and casing are supported by a platform in the depression.

Figure 2 is a view, in cross-sectional side elevation, taken on the line 2—2 of Figure 1.

Figure 3 is a top plan view of the casing, the cover being broken away to show the interior of the casing-body.

Figure 4 is a rear view of a piece forming, when in place, the upper portion of the front wall of the casing.

Figure 5 is a view, in longitudinal cross-section, taken on the line 5—5 of Figure 2, showing the means for attaching and locking the front piece of Figure 4 to the main body-portion of the casing.

Figure 6 is a view, in cross-sectional side elevation, showing the mounting of the casing on its base-piece when the standard for adapting the same to use on a desk having a depression is eliminated.

Figure 7 is a view taken on the line 7—7 of Figure 1.

Figure 8 is a top plan view of the casing base-piece; the same being broken away at one corner to show the sound-deadening lining and supporting plate therefor.

Figure 9 is a view, in cross-sectional side elevation, through the cover balancing or opening device; the parts being in the position assumed when the cover is closed.

Figure 10 is a view, in cross-section, on the line 10—10 of Figure 9.

Figure 11 is a view, in side elevation, of the cover opening or balancing device and its connections to the casing body and cover, with the cover in open position.

Figure 12 is a detail view, taken in cross-section on the line 12—12 of Figure 1, through the sound-deadening device at the side edge of the opening in the front wall of the casing; one of the front posts of the typewriting machine, and the position of the device when the machine is in place in the casing, being shown in dotted lines.

The casing is in two principal parts, to wit, a body-portion 10 and a cover 11; the cover being hinged at 12 at the rear thereof to the body-portion to swing from Figure 2 to Figure 11 position. Both the casing body and cover are shown as of sheet-material, preferably aluminum. The rear, front, and side walls of the casing-body are lined with sound-deadening material 13. The front wall of the casing is cut away, as at 14, so that the keyboard extension 15 of the typewriting machine 16 (indicated in dotted lines) may protrude therethrough.

For securing the lining 13 to the sheeting 10 of the casing, the latter has, staked therein, near its upper and lower edges, bosses or bushings 17, which pass through openings in the lining, and which are threaded to receive screws 18, which pass through retaining-straps 19 laid longitudinally of the inner face of the lining, to hold the straps to the bushings 17. At its lower edges the sheeting 10 has a reinforcing bead 20 formed peripherally thereon; and, from the bead 20, is turned inward to form a horizontal peripheral flange 21. The lower edge of the lining 13 is set upon the flange 21; and the flange, in addition to serving as a reinforcement, serves as a seat for the casing proper on its base-piece. At the front of the casing-body the lining 13 terminates with the sheeting 10 at the sides of the opening 14 for the keyboard extension. Below the keyboard extension, the sheeting 10 is continued, from side to side of the casing, as a slightly offset strip 10$^a$ (see Figure 2). The piece 10$^a$ is lined with a sound-deadening strip 23 held thereto by a strap 24, which is secured by screws 18$^a$ to bushings 17$^a$ staked or riveted in the sheet-metal. The lining-strip 23, like the lining 13, is set upon the peripheral flange 21 of the casing-body. The upper edge of the lining-strip 23 is extended, as at 23$^a$, as a resilient tongue to engage and press against a rod 26 on the machine when the latter is in place.

As shown in Figure 1, the casing is flared laterally upward and outward on the lines 30, to provide room in the top thereof for movement of the platen-carriage in letter-feed and return directions. The flaring side walls 30 terminate, at their upper ends, in horizontal overhangs 31, the ends of which are turned upward, to form flanges 32. The left-hand overhang 31 is wider than the right, to serve as a platform for a cover-opening device, and also to provide clearance for the left-hand end of the carriage in its extreme left-hand position, said carriage extending a little more to the left than to the right. The side lining-pieces 13 extend upward from the flange 21 at the foot of the casing-body, along the flaring walls 30, and thence, with reduced thickness on the left-hand overhang, across the overhangs, to the flanges 32, where they are again turned up to the height of the flanges 32. Near their lower edges, and at their upper edges, the side lining-pieces 13 are secured to the sheeting of the casing-body by straps 19, in the manner hereinbefore described. Where the left side piece 13 is bent from a lateral flare to the horizontal overhang, it is held by a strap 33, carried on fingers 34, secured to the front and rear walls of the casing-body by two of the screws 18, which assist in holding the front and rear upper straps 19. It will be noted (see Figure 1) that the strap 33 is bent longitudinally, as shown at 35, to the desired bend of the lining-piece, from an upward incline to a horizontal.

The upper part of the casing, due to the lateral flare of the side walls thereof to the overhangs, would ordinarily be wider than the platform 36 which may be the drop-leaf of a drop-desk; and, if an attempt were made to set the machine at its usual elevation on the drop-leaf, such attempt would be frustrated by engagement of the overhangs 31 of the casing with the upper corners 37 of a depression in the top of the desk, at either side of the drop-leaf. In order to permit the casing to clear said upper corners of the desk, and, nevertheless, to be supported upon the platform 36 located in a depression in the top of the desk, a bolster or standard 38 (see Figures 1 and 2) is interposed between the flange 21, which forms the lower edge of the casing proper, and the casing-basepiece 39. This standard (see Figures 1 and 7) is comprised of two U-shaped sheet-metal members 40, having their ends set together at 41, to form a rectangular piece. The members 40 are of channel-bar cross-section, partially split through on the lines 42, to permit folding at the corners; and the two members 40 are held together by plates 43, which overlap the joints 41, and which are riveted, as at 44, to the U-shaped sections. Set within the channel-bars 40 are strips of sound-deadening lining-material 45, held to the bars 40 by straps 46 set upon bushings 47, staked or riveted into the members 40, and held to the bushings by screws 48 in the same manner as the straps 19 are supported and held.

The base-piece 39 comprises an inverted sheet-metal pan 49, and a sheet 50 of sound-deadening material set into the same, and held therein by a plate 51, which may be of wood. The plate 51 and the sheet 50 are held to the pan 49, and the pan 49 and standard 38 to the flange 21 of the casing proper, by means of screws 52, having their heads 53 set into recesses in the wooden plate 51, and passing thence upward through the plate 51, sheet 50, pan 49 and channel-pieces 40, finally to thread into the flange 21 of the casing. As shown in Figure 7, the lining-pieces 45 of the channel-bars 40 of the standard are cut out at 54, to provide passages for the screws 52. The assembled casing, bolster 38 and base-piece 39 are held to the platform 36, and the machine anchored in the casing, by bolts 55, which have their heads 56 set in recesses in the bottom of the platform, and which pass upward through openings 57 in the base-piece 39, through the bolster 38 and into the casing proper, where they thread at 57ᵃ into bosses 58 on the main frame of the machine. When the bolster 38 is employed, in use of the casing on a platform in the depression of a desk, the usual short feet of the machine are replaced by longer ones 59, so that the feet may extend down through the top of the pan 49, to rest upon the sound-deadening material 50, and thus have the machine at an elevation corresponding with that of the casing. For locating the machine within the casing, the pan 49 has circular, upwardly-protruding guards 60 (see Figures 2 and 8) turned out of the same, into which the feet 59 are placed.

If the casing is to be used on a desk without a depression the bolster 38 is not necessary, and the casing-body may be supported directly upon the base-piece 39, as shown in Figure 6; that is to say, the flange 21 of the casing proper may be set directly upon the pan 49. The screws 52 will, in this instance, be shorter than the screws 52 shown in the Figure 2 structure; and the feet 59 of the machine will be of the ordinary height. The wooden plate 51 of the base-piece, Figures 1, 2 and 6, is shown as having pads or feet 61, of felt or other sound-deadening material, secured thereto, by screws 62, to prevent transmission of sound vibrations from the case to its support.

In order that the casing, or casing and standard, may be readily cleaned of dirt, from erasures and other sources, the base-piece 39 has an opening 64 therethrough, which is normally closed by a pan-like cover 65 (see Figures 2 and 3), having a peripheral flange 66, by means of which it is supported on the inverted pan 49 of the base-piece. For easy removal of the cover 65, the same is provided with a handle 67, pivoted at 68 to bosses 69 on said cover, so that the handle may normally be set down in Figure 2 position, but may be swung up for removal of the cover.

When the machine is in the position in the casing determined by the location of its feet in the guards 60, the front corner-posts 70 of the machine, as shown in Figure 8, abut the front wall of the casing at the side edges of the opening in the latter for the keyboard extension. For providing a sound-deadening joint on the lines of contact of the front posts of the machine with the front wall of the casing, and where the keyboard extends through the latter, cushions 71 (see Figure 12) are provided. These cushions, which extend vertically along the side walls 72 of the opening in the casing, each comprise a rubber tubing 73, held in the fold of a strip of felt 74; the ends of the felt being brought together and held to the casing by vertical straps 75, which, like the straps 19, are secured to bushings 76, staked or riveted to the sheeting 10 of the casing, by screws 77, which pass through the straps, through the edges of the felt 74, and thread into the bushings. As shown in Figure 12, the cushions 71 are flexibly held to the casing, so as to be movable by the posts 70 of the machine from a normal, full-line, Figure 12 position to the dotted-line, Figure 12 position. In the latter position, the cushions, by reason of their spring-setting, bear against the posts of the machine and effectually close the joint between the machine and the casing. The flexible mounting of the cushions permits the same to be swung rearward by the side plates of the keyboard extension, as the machine is set into the casing or removed therefrom; and, when the machine is in place, the dotted-line, Figure 12, setting of the upper portions of the cushions, effected by the posts of the machine, will, by reason of the rubber tubing 73, cause the lower portions of the cushions to bear closely against the keyboard extension; to seal the joints alongside the latter, as well as the joints between the posts and the casing above the keyboard extension.

To permit the machine to be readily placed within, and removed from, the casing, the front wall of the latter, above the position of the keyboard extension, is provided with a removable member (see Figures 2, 4 and 5). This removable member comprises a plate 78, adapted to extend from side to side of the wider upper portion of the casing. The plate 78 carries a strip 79, of sound-deadening material. As shown in Figure 4, the strip 79 extends along only that portion of the plate 78 which overlies the opening in the front wall of the casing; and, when the machine is in place, this strip 79 abuts the upper portion of the front of the machine-frame, closing the casing at this point against emission of sound. The plate 78 also carries the cushion 80, which forms the lower wall of the slot in the casing, along which the operating levers on the carriage of the machine move in the letter-feed and return movements of the latter. These levers are the line-space lever 81, carriage-return arm 82 and carriage-release lever 83. The cushion 80 comprises a rubber tubing 84, held in the fold of a strip of felt 85; the edges of the felt being brought together, at 86, between the plate 78 and the lining-strip 79. A strap 87 extends along the inner face of the lining-strip 79, and along the plate 78 beyond the ends of the lining-strip; and screws 88, passing through the strap, the lining-material, and the edges of the felt 85, thread into the plate 78, to hold the parts together. A bead 89, formed upon the upper edge of the plate 78, has its edge directed rearward, to serve as a front support for the cushion 80; and a plate 90, held by the screws 88, between the edges of the felt 85 and the strap 87, has its upper edge offset rearward, at 91, above the lining-member 79, to serve as a rear support for the cushion 80. The cushion 80 is, therefore, held, throughout its length, against rearward and forward displacement, in a seat formed in the upper edge of the removable casing-member.

The upper edge of the casing-body, at either side of the opening in the front wall thereof, is offset forward as shown at 92 in Figure 2; and the lower edge of the removable plate 78 is offset rearward at the same angle as the edge 92, so as to lie flatly upon the latter. Studs 93 on the plate 78 (see Figures 2 and 5) are adapted to be registered with, and passed through, openings 94 in the offset front edge of the casing-body. For locking the plate 78 to the casing-edge 92, there is, at each side thereof, a slide 95, held to the inner face of the edge piece 92 by headed pins 96, which pass through slots 97 in the slide. The plate 78, near each end thereof, carries a pin 98, adapted to be passed through an opening 99 in the edging piece 92, and to project beyond the inner face of the slide 95; and which terminates in a head 100. A shoulder 101 on the pin, together with the forward head of the pin, holds the same against forward and rearward displacement in the plate 78. The neck 102 of the pin, behind the plate 92, sets in a key-hole slot alongside a wedge 103 on the slide 95. The opening 99 in the plate 92 is sufficiently large to permit the free passage therethrough of the inner head 100 of the pin 98 in positioning the removable plate. At this time, the slide 95 will be at one side of the position thereof shown in Figure 5, so that the wedge 103 is out of the path of or to the right of the head 100 of the pin as the plate 78 is set on the casing. The plate being in proper position on the casing, however, the slide is moved to its Figure 5 position, causing the wedge 103 to pass under the head 100 of the pin 98, thereby locking the plate 78 to the casing. The wedge not only locks the plate 78 to the casing, but draws the plate tightly against the casing. The ends of the slots 97 by engagement with the pins 96 may determine the throw of the slide 95 in either direction. A finger-piece 105 is provided on the slide, whereby to operate the same. After the machine has seen set in place, and while the casing-cover is still open, the removable piece 78 is set in place and the locking slides 95 operated by the handles 105 from within the casing.

The lower front edge of the cover carries a cushion 106 which co-operates with the cushion 80 to close the slot along which the carriage-operating levers move. This cushion 106 may be in all respects like the cushion 80, and, like the latter, may be held in a seat formed by a bead 107 on the lower front edge of the cover and by a plate 108 like the plate 90; the cushion and the plate 108 being held to the sheeting 11 of the cover by a strap 109 and nuts 110ª on screws 110.

In order that the work-sheets on the typewriter-carriage 111 may not catch upon the lining 13 of the rear of the cover, the cover is provided with an inner facing or lining of smooth sheet-material 112. The sheet 112, at its upper forward edge, is secured by screws 113 to a U-shaped portion 114 of a bar 115, which extends longitudinally of the cover at the rear of an opening or window 116 in the cover, through which the printing on the platen 117 may be observed. As shown in Figure 1, the bar 115 is continued down the sides of the opening 116; and, as shown in Figure 2, is continued along the front of the opening 116; serving as a frame or sash for a window-pane 118. The bar 115, along the several reaches thereof, is secured by rivets 119 to the sheeting 11 of the cover. The pane, with its edges bound by a strip or strips of shock-absorbing material 120, is set against the U or channel shaped portions 114 of the bar, and against a peripheral flange or offset 121 thereof. The lining-piece 112 of the cover is extended slightly forward of its holding screws 113, as shown at 122 (Figure 2), to serve as a support for the rear edge of the window-pane. At its sides, the window-pane is held in its frame (see Figure 1), by metal strips 123, secured by screws 124 to the bar 115. At its front edge, the window-pane is supported by a rearward offset 125 of a bar 126, which may be one with the plate 108, forming part of the seat for the upper cushion 106. The rear, side, and a portion of the front, reaches of the bar 115 have an upward offset or flange 127, which serves as a shade to intercept rays of light which would otherwise fall upon the glass at such angle as to be objectionably reflected into the eyes of the operator.

For opening, or assisting in the opening, of the cover, a spring-device is provided. This device comprises a coil-spring 128 (see Figure 9), enclosed in a housing, consisting of two telescoping sleeves 129 and 130; the spring bearing, at one end, on a head 131 of the housing-member 129, and bearing, at its other end, against an adjustable head 132 in the housing-member 130. The housing-member 130 has, at its forward end, a head 133, fixed therein by pins 134; and, passing horizontally through the head 133 (see Figures 9 and 10), is a hinge-pin 135, set and threaded into a block 136, secured by screws 137 to the overhang 31 of the casing-body at the upper left-hand side of the latter. The housing as a whole may, therefore, have an up and down pivotal movement around the pin 135. On the head 131 of the housing-member 129 is formed an arm 138, pivotally connected at 139 to an arm 140, which, in turn, is pivotally mounted at 141 on a bracket 142, also set upon, and suitably secured to, the overhang 31 of the casing-body. The arm 140 carries a pin 143, on which is a roller 144, adapted to work in a slot 145 in an arm 146, forming part of a bracket 147, secured by screws 148 to the sheeting 11 of the cover, and at the rear of the latter. The cover-lining-member 13 is slotted, as indicated at 149, to receive the bracket-arm 146.

The spring 128 is compressed when the cover is closed, and, consequently, tends to force rearward arm 138, arm 140 and bracket-arm 146, to swing the cover rearward around the hinge 12. The cover in swinging rearward and upward, in the opening operation, causes the housing 129—130 to swing upward on its pivot 135, as indicated in Figure 11. The slot 145 is so directed as to permit of the pivotal movements of the cover and spring-housing; while providing for the direct pressure of the roller 144 on the bracket-arm 146. The lower rear end wall of the slot 145 serves as a stop to determine the throw of the cover in the opening operation.

To serve as a brake or cushion, to prevent shocks to the cover, when the same is arrested in the opening operation, there is a leaf-spring 150, set in the cut 149 in the lining-member, and secured to the bracket 147 by a screw or rivet 151. At the end of the pin 143 is a collar 152 (Figures 3 and 11), against which the leaf-spring 150 is caused to bear with increasing pressure as the cover is opened. In other words, the upward movement of the cover, in the opening operation, brings the bellied portion of the leaf-spring (see Figure 11) into breaking engagement with the collar 152. The collar 152 may be eccentric, and angularly adjustable on the pin 143, for adjustment of the tension of the spring 150.

The tension of the spring 128 in the housing is adjusted by varying the position of the head 132 therein. For this purpose, the head 132 is secured to a block 153, in threaded engagement with a stud 154. The stud 154 is held in the front head 133 of the housing, against longitudinal movement therein, by means of a collar 155, set into a recess in the stud, against the inner face of the head 133, and a collar 156, secured by a key 157 to the end of the stud, at the outer face of the head 133. The collar 156 has pin-holes 158 therein, to receive a pin-tool, by means of which the collar, and, consequently, the stud 154, may be turned, to move the head 132 in one or the other direction. To prevent the head 132 from overriding the inner end of the stud 154, the latter has a headed screw 160 set into the inner end thereof.

For locking the cover against the action of the spring-device, just referred to, there is pivoted at 161 (Figure 2), to one of the side walls of the cover, a hook 162, which depends into the body-portion of the casing. When the cover is shut and the hook 162 is swung forward, it engages a detent 163, carried by the casing-body. Mounted to be slid rearward and forward in the front wall of the casing-body is a spring-pressed pin 164, carrying on its outer end a finger-piece 165, and having on its inner end a head 166, adapted to engage the end of the hook 162. When the key or finger-piece 165 is pressed rearward, the head engages a lip 162ª on the hook 162 to disengage the hook from the detent 163 and release the cover to the action of the spring 128.

In order that the hook may not be injured by the typewriting machine, in the operation of removing the latter from the casing, and may not be struck by the operator, or otherwise bent or injured, it is set in a housing. This housing is in two sections, one section 170 being on the cover, and the other section 171, which forms a continuation of the section 170, being on the casing-body. As shown in Figure 2, the housing 170 is a punched-press piece in the form of a pan, set edge-on to the casing-cover against bushings, staked or riveted on the side wall of the cover; and anchored to such bushings by screws 172, which pass through the bottom of the pan and thread into the bushings. The lower side wall of the pan has an opening 173 therein, through which the hook 162 passes, and within which the hook may swing. A leaf-spring 174, secured at one end to the rear of the hook 162, and at its other end bearing against one of the bushings, acts to throw the hook forward into cover-locking position. The release-button-housing 171 is also made of a punching, and is secured to the flange 32 of the body-portion of the casing by two flat-head screws 175 (Figure 3). The front and rear walls of the housing 170 are turned in at 170ª and 170ᵇ to serve as stops to limit the throw of the hook.

To serve as stops or rests for the cover, on the forward part of the casing-body, are two pieces of fiber 176 (Figures 1 and 3), one at each side of the casing secured to the casing by screws 177. The edge of the casing-cover is recessed or cut away, at 178, to provide seats for the cover on the fiber-pieces 176; and these recesses are so shaped as to permit the cover to clear the fiber-pieces 176 when swung up and down around its hinge 12. The stops 176 and seats 178 positively determine the closed position of the cover, and eliminate the necessity for truing the opposing edges of the lining-strips at the sides of the cover and casing-body.

Referring to the cover-opening device, it will be noted that the length of the arm between the pivot 141 and the roller 144 is greater than the length of the arm between the pivot 141 and the pin 139. In other words, the arm 140 serves to amplify the movement received by it from the member 138; and the cover-operating arm 146 receives a greater motion than does the arm 138. To effect an ample movement of the cover, a relatively small movement of the spring-actuated arm 138 is, therefore, required. Since the spring 128 needs but slight expansion in the cover-opening operation, the spring may be made of a size and strength to perform its function effectively. Furthermore, the space required for the expansion of the housing, and for the swing of the housing on its pivot, may, by reason of the amplifying arm 140, be less than would otherwise be required to give the cover its full opening movement.

As to the bolster 38 for elevating the casing for use of the same on a drop-leaf, it will be noted that the same is placeable and removable, at will, between the casing-body and the base-piece 39; on which latter the machine rests, whether the standard be present or not. In other words, the bolster need not be constructed to support the weight of the machine; and, in the absence of necessity of provision for so supporting the machine, may be of cheaper and lighter construction than otherwise. The channel-bar cross-section of the bolster 38 gives the same great rigidity against distortion.

As to the removable member or plate 78, it is to be noted that the construction and attachment thereof permit of the front of the casing, at the sides of the opening for the typewriter-keyboard, being continuous in one piece with the sheeting 10, forming the main body of the casing. Because of the character of the pieces 73, which extend along the side edges of the opening on the fixed front wall of the casing, such opening may be made of ample size to permit of easy insertion of the machine down through the casing-body to the base-piece; without, however, causing open joints to be presented between the key-board extension and casing front wall, and without necessitating any adjustment of parts to close the joints between the keyboard of the machine and the casing.

Variations may be resorted to within the scope of the invention, and portions of the improvements may be used without others.

Having thus described my invention, I claim:

1. The combination of a typewriting machine, a sound-deadening casing therefor having a body-portion with lateral overhangs at the top thereof to provide space for movement of the carriage, means supporting said machine and casing upon a desk having a platform depressed below the top of the desk, said casing having a removable base-piece and a bolster insertable between the base-piece and the casing-body to elevate the latter to cause the lateral extensions to clear the corners of the desk at the top of the depression, and means to elevate the machine according to the elevation of the casing-body.

2. The combination with a sound-deadening casing for a typewriting machine, having an overhanging body-portion to provide space for movement therein of the typewriter-carriage, and a removable base-piece, of a bolster insertable, at will, between the base-piece and the body-portion of the casing to elevate the latter, to cause the overhangs thereof to clear the corners of a depression in the top of a desk when the base-piece is set upon a platform in the depression.

3. The combination with a sound-deadening casing for a typewriting machine, having an overhanging body-portion to provide space for movement therein of the typewriter-carriage, and a base-piece on which the machine is adapted to be set, of a bolster between the base-piece and the casing-body to elevate the latter, to cause the overhangs thereof to clear the corners of a depression in the top of the desk when the base-piece is set upon a platform in the depression.

4. The combination with a sound-deadening casing for a typewriting machine, having an overhanging body-portion to provide space for movement therein of the typewriter-carriage, and a base-piece on which the machine is adapted to be set, of a bolster between the base-piece and the casing-body to elevate the latter, to cause the overhangs thereof to clear the corners of a depression in the top of a desk when the base-piece is set upon a platform in the depression; said bolster being hollow and of channel-bar cross-section.

5. The combination with a sound-deadening casing for a typewriting machine, having an overhanging body-portion to provide space for movement thereof in the typewriter-carriage, and a base-piece on which the machine is adapted to be set, of a bolster between the base-piece and the casing-body to elevate the latter, to cause the overhangs thereof to clear the corners of a depression in the top of a desk when the base-piece is set upon a platform in the depression; said bolster being composed of two U-shaped sections, set end to end to form a rectangle, and secured together by straps crossing the joints therein.

6. The combination with a sound-deadening casing for a typewriting machine, having an overhanging body-portion to provide space for movement therein of the typewriter-carriage, and a base-piece on which the machine is adapted to be set, of a bolster between the base-piece and the casing-body to elevate the latter, to cause the overhangs thereof to clear the corners of a depression in the top of a desk when the base-piece is set upon a platform in the depression, said bolster having a lining of sound-deadening material.

7. The combination with a sound-deadening casing for a typewriting machine, having an overhanging body-portion to provide space for movement therein of the typewriter-carriage, and a base-piece on which the machine is adapted to be set, of a bolster between the base-piece and the casing-body to elevate the latter, to cause the overhangs thereof to clear the corners of a depression in the top of a desk when the base-piece is set upon a platform in the depression; said bolster being of channel-bar cross-section, having a strip or strips of lining-material set in the channel thereof.

8. The combination with a sound-deadening casing for a typewriting machine, having an overhanging body-portion to provide space for movement therein of the typewriter-carriage, and a base-piece on which the machine is adapted to be set, of a bolster between the base-piece and the casing-body to elevate the latter, to cause the overhangs thereof to clear the corners of a depression in the top of a desk when the base-piece is set upon a platform in the depression; said bolster being of channel-bar cross-section, having a strip or strips of lining-material set in the channel thereof; bushings staked or riveted to the channel-pieces, and extending through the lining-material, straps laid lengthwise of the channel-pieces, on the bushings, and screws or pins passing through the straps and into the bushings, to hold the straps and lining-material in place.

9. The combination with a sound-deadening casing for a typewriting machine, having an overhanging body-portion to provide space for movement therein of the typewriter-carriage, and a base-piece on which the machine is adapted to be set, of a bolster between the base-piece and the casing-body to elevate the latter, to cause the overhangs thereof to clear the corners of a depression in the top of a desk when the base-piece is set upon a platform in the depression; said bolster being of channel-bar cross-section, having holes in the wings thereof; and screws or bolts passing through the base-piece and through the holes in the bolster for securing the base-piece and the bolster to the casing proper.

10. The combination with a typewriting machine, of a sound-deadening casing therefor, and means to elevate the casing to different heights, a sound-proof seal being maintained between the casing and its supporting means when the casing is so elevated.

11. The combination with a typewriting machine, of a sound-deadening casing therefor, and means selectively to elevate the casing to different heights, a sound-proof seal being maintained between the casing and its supporting means when the casing is so elevated to different heights.

12. The combination with a typewriting machine, of a sound-deadening casing therefor, and a single means having dual functions to both elevate the casing and at the same time maintain a sound-proof seal between said casing and its supporting means.

13. The combination with a typewriting machine, of a sound-deadening casing therefor, means normally to support the casing, and means selectively to elevate the casing to different heights relatively to the support, said last-named means comprising plural members, one of which elevate the casing to a predetermined height and at the same time maintains a sound-proof seal between said normal supporting means and the casing, and the other of which co-operates with said first-named member to further elevate said casing, and at the same time maintain a sound-proof seal between the casing and said first-named member.

14. The combination with a typewriting machine, of a sound-deadening casing therefor, having a portion of its body of greater over-all dimension than that between the side walls adjacent a platform in the depression of a desk, and means to elevate said casing to permit it to be supported by said platform, so that said portion of the casing clears the corners of the depression, comprising a base-piece and a supplemental member co-operating with each other and with both the casing and the platform to deaden sounds from the typewriting machine and prevent emission of sounds toward the direction of the platform.

15. The combination of a typewriting machine, a sound-deadening casing therefor having a body-portion with lateral overhangs at the top thereof to provide space for movement of the carriage, means supporting said machine and casing upon a desk having a platform depressed below the top of the desk, said casing having a removable base-piece and a bolster insertable between the base-piece and the casing-body to elevate the latter to cause the lateral extensions to clear the corners of the desk at the top of the depression, and replaceable feet under the machine frame to elevate the machine according to the elevation of the casing-body.

ALFRED G. F. KUROWSKI.